April 19, 1927. 1,624,959
G. LUNDBERG
PLATE CARRIER FOR MULTICOLOR CAMERAS
Filed July 22, 1925
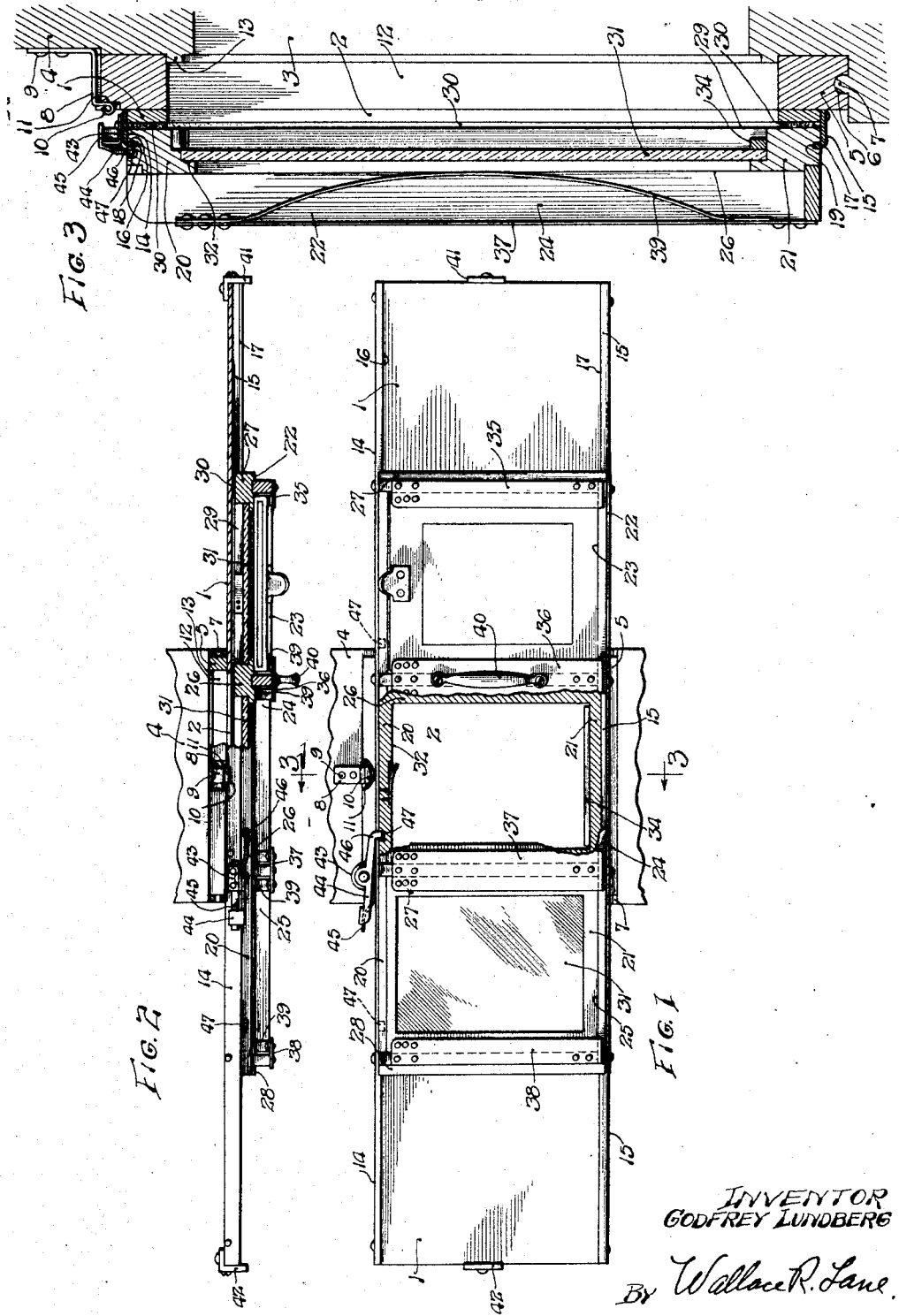
INVENTOR
GODFREY LUNDBERG
By Wallace R. Lane.
ATTY Patented Apr. 19, 1927.

1,624,959

UNITED STATES PATENT OFFICE.

GODFREY LUNDBERG, OF WINNETKA, ILLINOIS, ASSIGNOR TO THE TRIBUNE COMPANY, OF CHICAGO, ILLINOIS, A CORPORATION OF ILLINOIS.

PLATE CARRIER FOR MULTICOLOR CAMERAS.

Application filed July 22, 1925. Serial No. 45,178.

The present invention relates to photographic devices and more particularly to multi-color work, such as the tri-color process.

Among the objects of the invention is to provide a photographic device with a light stopping wall and a frame slidable along the wall, preferably on guide members carried by the wall and having a plurality of openings each capable of being brought into registry with an exposure opening in the camera or photographic apparatus, the frame being adapted to carry sensitive plates or the like, in the frame openings, for the exposure, successively, at the exposure opening.

The invention also comprehends the use of means for automatically stopping the frame in its sliding movement, with any given frame opening in registry with the exposure opening in the camera body or apparatus, such stop means being specifically a spring pressed latch being pivotally mounted upon the wall and having a finger or lug adapted to snap into slots or recesses formed in the frame and located at appropriate intervals for bringing the frame at a stop so that the frame openings will successively register with the exposure opening.

The frame also has means for stopping the leakage of rays of light into the apparatus, preferably by the use of grooves and packing in the grooves, carried by the frame and cooperating with the wall for acting as a light stop or seal.

The frame is also designed to receive color screens or light filters in the frame openings and plate or film holders, the latter being inserted and removable as complete units so that loading and developing can be made of the individual plates or films without necessitating the taking of the whole frame and wall to the dark room, the present invention having the advantage of taking color pictures in rapid succession at a single sitting and permitting the loading and unloading of the individual plates or films into and from the usual plate holders, the holders being simply inserted into or removed from the frame independently of the other holders, and without necessitating the carrying of the frame from one place to the other such as from the studio room to the dark room or otherwise. Any number of exposures may be had in this way without being encumbered with the carrying of the whole frame to the dark room for changes of plates or the like.

Other objects, advantages and capabilities are comprehended by the invention as will later appear and are inherently possessed by the invention.

Referring to the drawings showing an embodiment of the invention, Figure 1 is a rear view in elevation and partly in section of a device constructed in accordance with the invention.

Figure 2 is a top plan view of the same with parts broken away and shown in section.

And, Figure 3 is a vertical transverse section taken in a plane represented by line 3—3 in Figure 1 of the drawings.

Referring now more in detail to the drawings, the embodiment selected to illustrate the invention is shown as comprising an elongated wall 1 having a central opening 2 located in registry with an exposure opening 3 of the rear end of a photographic camera or apparatus 4. To the rear of the wall 1 and surrounding the opening 2 therein, is suitably attached or secured a connecting frame 5 which is preferably provided at its lower portion with a groove 6 fitting over a rib 7 of the rear portion of the camera, and at its upper part is held in position with the camera by means of a clip 8 secured as by screws 9 to the back of the camera and having a snapping lip 10 adapted to engage over the rear upper edge portion 11 of the member 5. The latter member has an opening 12 in registry with the openings 2 and 3. In order to provide for sealing or stopping the entry of light rays, the camera body may be provided with a light stop ridge 13 extending into the opening 12 of the frame or casing 5. The wall 1 may be secured to the member 5 in any suitable manner as to prevent the entry of light therebetween.

At the upper and lower edges of the wall 1 are secured guide members 14 and 15, having guide flanges 16 and 17 received in grooves 18 and 19 respectively formed in the top and lower members 20 and 21 of a sliding frame 22. This sliding frame has three openings or compartments 23, 24 and 25 separated by vertical connecting members 26 as clearly shown in the drawings. At the ends of the sliding frame are also vertical members 27 and 28.

Upon the inner faces 29 of the frame member may be located suitable packings 30 or the faces 29 may be provided with grooves in which the packing 30 may be placed, such packing co-operating with the adjacent face of the wall 1 so as to provide a light stop against the entry of light rays within the apparatus. It will be noted that the packing 30 is preferably provided against the upper and lower members 20 and 21 and the end members 27 and 28 of the sliding frames, but may also be provided on the inner faces of the vertical members 26 if desired.

Within each opening 23, 24 or 25 of the sliding frame, is provided a colored screen or light filter 31 of the desired color whereby the colored rays may be transmitted to the plate in the plate holder to be described later. In three color work these screens vary in different colors such that the screen in one compartment will be one color, that in an other compartment being that of another color and in the third compartment of a third color. The screen 31 is held in any suitable manner against a rabbeting 32 formed in the frame 22 and held in place by any suitable means 34.

At the rear of each screen 31 is a space in which a complete plate holder may be inserted, this space being provided between the uprights or posts 27 and 26 or between the posts 26 and 26 or the posts 26 and 28, for the different compartments, and on these posts may be secured overhanging flange members 35, 36, 37 and 38 whereby the overhanging portions thereof into the spaces of the openings will act as shoulders between which and the rabbeting 32, may be slid the frame of the plate holder. The overhanging flange members 39 may also be provided with suitable springs which will hold a plate holder in proper position in its respective compartment. To one of the uprights 26 may be secured a handle 40 by which the frame may be manually slid from one end to the other end of the wall 1. Preferably the wall 1 is colored a dull black so that there is no possibility of reflecting any light rays from its surface to the interior of the device.

At the ends of the wall 1 are provided stops 41 and 42 secured in any suitable manner and adapted to prevent the over-running of the sliding frame when the same is moved to one or the other end of the wall 1. Upon the upper guiding member 14 is secured a bracket support 43 to which is pivotally mounted a spring pressed latch 44 having a reacting spring 45 normally pressing a finger or lug portion 46 of the latch into a recess 47 provided in the upper edge or member 20 of the sliding frame. As shown, there are a number of these recesses in proportion to the number of compartments used, and are so spaced that when the latch is once released from a preceding recess, and the frame is then slid to the left and the latch permitted to act under the spring 45, the finger 46 will automatically drop into a succeeding recess and bring the sliding of the frame to a stop with an opening thereof in registry with the exposure opening of the camera.

In the use and operation of the device, the wall 1 and the sliding frame are attached to the rear exposure opening 3 of a photographic apparatus or camera, in the manner indicated. When it is desired to take three color pictures of a person or object at a single sitting, the plates are loaded in plate holders in a suitable dark room and are then placed in the compartments of the sliding frame. The frame may be at the right hand end of the wall 1 as viewed in Figures 1 and 2 of the drawing, and with the first compartment either in registry with the exposure opening or even to the right hand side thereof, depending upon the length of wall 1 used. Prior to the insertion of the plate holder in the left hand compartment, a focusing screen might be inserted for focusing the objects into the focal plane and then the plate holder may be inserted in place. It is to be understood that these plate holders when carried from the dark room are provided with dark slides. Assuming now that the shutter of the camera is closed and ready to be operated, the operator may then remove all of the slides from the plate holders and the frame is ready to be moved to the left. He then depresses upon the latch 44 to relieve it from its first recess, and the frame is slid to the left, the latch being immediately released. The succeeding recess will engage with the latch lug 46 and bring the first compartment into registry with the exposure opening, and the operator may then operate the shutter, and then immediately depress the latch, shift the frame, while at the same time releasing the latch and bringing the second plate holder into registry with the exposure opening when the latch automatically engages with the respective stop recess for that compartment and so forth until the series of the pictures are taken.

The slides may now be replaced in the plate holder, and each plate individually and independently taken out of its respective compartment and taken to the dark room for unloading and developing.

While I have herein described and upon the drawings shown, one embodiment of the invention, it is to be understood that the invention is not limited thereto but may comprehend other constructions, arrangements of parts and details without departing from the spirit thereof.

Having thus disclosed my invention, I claim:

1. A photographic device comprising a wall having an exposure opening, a frame slidable along said wall and having a plurality of openings adapted to be brought successively in register with said exposure opening, and a spring projected latch for automatically stopping the frame with an opening thereof in register with said exposure opening, said frame having means for holding sensitive plates in said frame openings.

2. A photographic device comprising a wall having an exposure opening, a frame slidable along said wall and having a plurality of openings adapted to be brought successively in register with said exposure opening, and latch means carried by said wall and yieldably held in engagement with said frame the latter having recesses at intervals therein for receiving said latch means and stopping the frame with an opening thereof in registry with said exposure opening, said frame having means for holding sensitive plates in said frame openings.

3. A photographic device comprising a wall having an exposure opening, a frame slidable along said wall and having a plurality of openings adapted to be brought successively in register with said exposure opening, and a spring pressed latch pivotally mounted on said wall and having a stop lug adapted to enter any of a series of recesses provided at intervals in said frame for stopping the frame with an opening thereof in registry with said exposure opening, said frame having means for holding sensitive plates in said frame openings.

4. A photographic device comprising a wall having an exposure opening, a frame slidable along said wall and having a plurality of openings adapted to be brought successively in register with said exposure opening, and individual holders adapted to receive plates and dark slides and to be inserted in said frame openings, said holders being adapted to be moved to and from a dark room individually without removal of said frame.

5. A photographic device comprising a wall having an exposure opening, a frame slidable along said wall and having a plurality of openings adapted to be brought successively in register with said exposure opening, color screens located in said frame openings, and individual holders adapted to receive plates and dark slides and to be inserted in said frame openings behind said color screens, said holders being adapted to be moved to and from a dark room individually without removal of said frame.

6. A photographic device comprising a wall having an exposure opening, a frame slidable along said wall and having a plurality of openings adapted to be brought successively in register with said exposure openings, stops at the ends of said wall for preventing the overrunning of said frame at the ends of the movements thereof, said frame having means for holding sensitive plates in said frame openings.

7. A photographic device comprising a wall having an exposure opening, a frame slidable along said wall and having a plurality of openings adapted to be brought successively in register with said exposure opening, said frame adjacent the openings therein having overhanging guide members for removably retaining the plate holders in said openings, and color screens in said frame openings between said wall and said plate holders in said frame openings.

8. A photographic device comprising a wall having an exposure opening, a frame slidable along said wall and having a plurality of openings adapted to be brought successively in register with said exposure opening, said wall having upper and lower guide flanges, said frame having grooves for slidably receiving said flanges, said frame having means for holding sensitive plates in said frame openings.

9. A photographic device comprising a wall having an exposure opening, a frame slidable along said wall and having a plurality of openings adapted to be brought successively in register with said exposure opening, said frame having shoulders in said openings and flanges spaced from said shoulders where spaces are provided between said shoulders and said flanges for the insertion of plate holder units.

In witness whereof, I hereunto subscribe my name to this specification.

GODFREY LUNDBERG.